US007830868B2

(12) United States Patent
Buckley (10) Patent No.: US 7,830,868 B2
(45) Date of Patent: *Nov. 9, 2010

(54) SYSTEM AND METHOD FOR EFFECUTATING A SIP CALL IN A NETWORK ENVIRONMENT INCLUDING IMS

(75) Inventor: Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 202 days.

This patent is subject to a terminal disclaimer.

(21) Appl. No.: 11/347,874

(22) Filed: Feb. 6, 2006

(65) Prior Publication Data

US 2007/0201441 A1 Aug. 30, 2007

(51) Int. Cl.
*H04L 12/66* (2006.01)
(52) U.S. Cl. .................. 370/353; 370/354; 370/356; 379/88.17; 455/403; 455/428
(58) Field of Classification Search ............ 370/328, 370/356, 352, 401, 471, 392, 353, 354; 455/445, 455/403, 428; 379/88.17
See application file for complete search history.

(56) References Cited

U.S. PATENT DOCUMENTS

| 2005/0058125 | A1* | 3/2005 | Mutikainen et al. ......... 370/354 |
| 2005/0195762 | A1 | 9/2005 | Longoni et al. |
| 2005/0233727 | A1 | 10/2005 | Poikselka et al. |
| 2006/0209805 | A1* | 9/2006 | Mahdi et al. ................ 370/352 |
| 2006/0268900 | A1 | 11/2006 | Larsson et al. |
| 2006/0280169 | A1* | 12/2006 | Mahdi ......................... 370/352 |
| 2007/0014281 | A1* | 1/2007 | Kant ........................... 370/352 |
| 2007/0041367 | A1 | 2/2007 | Mahdi |
| 2007/0049281 | A1* | 3/2007 | Chen et al. ................. 455/445 |
| 2007/0058788 | A1* | 3/2007 | Mahdi et al. ............. 379/88.17 |

(Continued)

FOREIGN PATENT DOCUMENTS

EP 1 811 745 A1 7/2007

(Continued)

OTHER PUBLICATIONS

U.S. Appl. No. 60/684,046 May 24, 2005.*

(Continued)

*Primary Examiner*—Fan Tsang
*Assistant Examiner*—Simon King
(74) *Attorney, Agent, or Firm*—The Danamraj Law Group, P.C.

(57) ABSTRACT

In one embodiment, a scheme is disclosed for routing a Session Initiation Protocol (SIP) call in a network environment including a circuit-switched (CS) network and an IP multimedia subsystem (IMS) network. When a SIP call is originated by a user equipment (UE) device in the CS network domain, call information associated with the call is provided to an application server (AS) node disposed in the IMS network. At the AS node, a pool of E.164 numbers are maintained as IP multimedia routing numbers (IMRNs) which are mapped to or otherwise associated with called party SIP URIs. The AS node dynamically allocates a select IMRN with respect to a called party's SIP URI received from the UE device and returns it to the UE device. The dynamically allocated IMRN is then utilized for routing the SIP call towards the called party.

20 Claims, 6 Drawing Sheets

U.S. PATENT DOCUMENTS

| | | |
|---|---|---|
| 2007/0064886 A1 | 3/2007 | Chiu et al. |
| 2007/0165612 A1 | 7/2007 | Buckley |
| 2007/0183410 A1 | 8/2007 | Song et al. |

FOREIGN PATENT DOCUMENTS

| | | |
|---|---|---|
| KR | 1020060114349 A | 11/2006 |
| WO | 2004068261 A2 | 8/2004 |

OTHER PUBLICATIONS

U.S. Appl. No. 60/689,883 filed on Jun. 13, 2005.*
U.S. Appl. No. 60/710,056 filed on Aug. 22, 2005.*
U.S. Appl. No. 60/713,143 filed on Aug. 31, 2005.*
U.S. Appl. No. 60/724,730 filed on Oct. 7, 2005*
U.S. Appl. No. 60/749,155 filed on Dec. 9, 2005.*
U.S. Appl. No. 60/724,730 filed on Oct. 7, 2005.*
European Search Report; European Patent Office; Sep. 17, 2007; 10 pages.
Oxley, D. et al.; "Techniques to Support VoIP Using WAP in a 2G and GPRS in 2.5G Networks"; 5 pages.
"3GPP TSG-SA2 Meeting #55"; Busan, South Korea; Oct. 23-27, 2006; pp. 1 through 7.
3rd Generation Partnership Project; Technical Specification Group Services and System Aspects; Voice Call Continuity between CS and IMS: Stage 2 (Release 7); Aug. 2006; 41 pages.
European Examination Report; European Patent Office; Jul. 20, 2006; 5 pages.
European Search Report; European Patent Office; Jun. 27, 2006; 3 pages.
European Search Report; European Patent Office; Jun. 14, 2006; 2 pages (European Patent Application No. 06250110.1).
T. Alexiou et al.; "The SIP Allocate Method"; SIPPING Working Group; Feb. 2002; pp. 1-9.
Digital cellular telecommunications system (Phase 2+); Numbering, addressing and identification (3GPP TS 03.03 version 5.5.0 Release 1996); Global System for Mobile Communications; Sep. 2003; pp. 1-21.
"3rd Generation Partnership Project; Technical Specification Group Services and System Aspects; Voice All Continuity between CS and IMS Study (Release 7)"; Global System for Mobile Communications; Dec. 2005; pp. 1-153.
"Communication Management"; pp. 501-565.
European Search Report; European Patent Office; Jan. 2, 2008; 14 pages.
3rd Generation Partnership Project; Technical Specification Group Services and System Aspects; Voice Call Continuity (VCC) between Circuity Switched (CS) and IP Multimedia Subsystem (IMS); Stage 2 (Release 7); Jun. 2007; 36 pages.
Korean Patent Office; Notice Requesting Submission of Opinion with English Translation; Aug. 7, 2008; 11 pages.
European Patent Office; EP Search Report for Application No. 06118838.9-1244; Jan. 23, 2007; 6 pages.
3rd Generation Partnership Project; Technical Specification Group Services and System Aspects; Voice Call Continuity between CS and IMS Study; Global System for Mobile Communications; Release 7; Dec. 2005; pp. 1-153.
T. Alexiou et al.; The SIP Allocate Method; Sipping Working Group; Feb. 2002; pp. 1-9.
Communication Management; XP-002103158; 501-565.
Examiner's First Report for Application No. 2007221785; Australian Government, IP Australia; Jan. 29, 2009; 2 pages.
PCT Notification of Transmittal of the International Search Report and the Written Opinion of the International Searching Authority, or Declaration; International Searching Authority; Sep. 23, 2008; 14 pages.
European Search Report; European Patent Office; Oct. 22, 2008; 8 pages.
EPO Extended European Search Report in Application No. 09154845.3; European Patent Office; Apr. 22, 2009; 6 pages.
China Office Action, Application No. 200710007388.8; Republic of China; Oct. 30, 2009; 9 pages.
Canadian Office Action; Application No. 2,573,433; Canadian Intellectual Property Office; Apr. 15, 2010; 5 pgs.
Chinese Office Action; Application No. 20071015267632; State Intellectual Property Office of People's Republic of China; Mar. 29, 2010; 3 pgs.
EPO Communication; Application No. 07 114 570.0; European Patent Office; Feb. 12, 2010; 4 pgs.
Mexican Office Action; Application No. MX/a/2007/012131; Mexican Patent Office; Feb. 19, 2010, 2 pgs.
Chinese Office Action, Application No. 200710162407.4, State Intellectual Property Office of People's Republic of China, Jun. 11, 2010: 4 pgs.
Chinese Office Action, Application No. 200710194436.9, State Intellectual Property Office of People's Republic of China, Jun. 2, 2010, 8 pgs.
Chinese Office Action, Application No. 200710007388.8, State Intellectual Property Office of People's Republic of China, May 12, 2010, 3 pgs.
Australian Examiner's First Report, Application No. 2007200330, Australian Government IP Australia, Jul. 19, 2010, 2 pgs.
Taiwanese Office Action, Application No. 096100821, Intellectual Property Office, Jun. 8, 2010, 2 pgs.
EPO Communication Examination Report, Application No. 09154845.3, European Patent Office, Jul. 28, 2010, 3 pgs.
Australian Examiner's Second Report, Application No. 2007200056, Australian Government IP Australia, Jun. 2, 2010, 2 pgs.
Mexican Office Action; Application No. Mx/a/2007/012244, Jul. 15, 2010, 2 pgs.

* cited by examiner

SYSTEM AND METHOD FOR EFFECTUATING A SIP CALL IN A NETWORK ENVIRONMENT INCLUDING IMS

REFERENCE TO RELATED APPLICATION(S)

This patent application discloses subject matter that is related to the subject matter of the following U.S. patent application: "SYSTEM AND METHOD FOR MANAGING CALL ROUTING IN A NETWORK ENVIRONMENT INCLUDING IMS", application Ser. No. 11/328,875, filed Jan. 10, 2006, which is hereby incorporated by reference.

FIELD OF THE DISCLOSURE

The present patent disclosure generally relates to call routing in communications networks. More particularly, and not by way of any limitation, the present patent disclosure is directed to a system and method for managing call routing in a network environment including a circuit-switched (CS) network and an IP multimedia subsystem (IMS) network, wherein a CS-originated IP call (e.g., based on the Session Initiation Protocol or SIP) is to be routed using the IMS network infrastructure.

BACKGROUND

Today's advanced communication devices are capable of seamlessly operating in a packet-switched IP network domain (using, for example, wireless LAN (WLAN) or Wi-MAX networks, etc.) as well as a circuit-switched cellular network domain. To facilitate such capability, current $3^{rd}$ Generation Partnership Project (3GPP) standards specify a new, IP-based network architecture referred to as the IP multimedia subsystem (IMS) which allows a communication device (referred to as user equipment or UE) to initiate calls to both IP-only subscribers and conventional circuit-switched telephony subscribers using either of the domains. There may arise a situation, however, where a wireless device, i.e., a UE device in 3GPP, is able to make a voice call to a called party using the circuit-switched network domain only because either no packet-switched network is available or the available networks in the packet-switched domain do not support the Voice-over-IP (VoIP) service. In such a situation, if the called party happens to be an IP-only subscriber and is identified with a Uniform Resource Indicator (URI), the originating UE may not be able to make the IP-based call since the UE device can effectuate only E.164 number-based calls while operating in the circuit-switched domain.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for routing an IP call, e.g., a Session Initiation Protocol (SIP)-based call, in a network environment including a CS network domain and an IMS network domain. When a SIP call is originated by a UE device operating in the CS domain, call information associated with the call (including the called party's SIP URI) is provided to an application server (AS) node disposed in the IMS network. At the AS node, a pool of E.164 numbers are maintained as IP multimedia routing numbers (IMRNS) which are configurable to be mapped to or otherwise associated with called party SIP URIs. The AS node dynamically allocates a select IMRN with respect to a called party's SIP URI received from the UE device and returns it to the UE device. The dynamically allocated IMRN is then utilized for routing the SIP call towards the called party upon interrogating the SIP URI—IMRN mapping, whereupon it may be released back to the pool of IMRNs for future use. Appropriate timers may be provided at the device and AS node endpoints so that it can be verified whether a call reference number associated with the call remains valid (e.g., it has not timed out) or the dynamically allocated IMRN remains valid (e.g., it has not timed out). Optionally, the released IMRN may be quarantined for a period of time.

In one aspect, a method is disclosed for routing a SIP call in a network environment including a CS network and an IMS network, the SIP call being originated in the CS network domain by a UE device towards a called party having a SIP URI, the method comprising: providing call information associated with the call from the UE device to an AS node disposed in the IMS network; at the AS network node, dynamically allocating an IMRN selected from a pool of IMRNs, wherein the dynamically allocated IMRN is mapped to the called party's SIP URI; providing the dynamically allocated IMRN to the UE device from the AS node; and utilizing the dynamically allocated IMRN for routing the SIP call towards the called party.

In another aspect, disclosed herein is a UE device operable to originate a SIP call in a network environment including a CS network and an IMS network, the call being directed towards a called party having a SIP URI, the device comprising: means for providing call information associated with the SIP call to an AS node disposed in the IMS network, the call information including at least one of a call reference number and a called party's SIP URI; means, responsive to receiving a dynamically allocated IMRN from the AS network node, wherein the dynamically allocated IMRN is selected from a pool of IMRNs and mapped to the called party's SIP URI, for verifying that the call reference number remains valid (e.g., it has not timed out); and means, responsive to verifying that the call reference number is valid, for providing the dynamic IMRN to the AS node in order to facilitate a SIP session with respect to the called party based on the IMRN—SIP URI mapping.

In yet another aspect, disclosed herein is an AS node adapted to be disposed in an IMS network, the AS node comprising: means for maintaining a pool of IMRNs that can be configured to be mapped to a plurality of SIP URIs, wherein a select IMRN is dynamically allocable to a called party's SIP URI received from a UE device with respect to a SIP call originated in a circuit-switched network domain; means for dynamically allocating the select IMRN to the called party's SIP URI received from the UE device and for providing the select IMRN to the UE device; and means for verifying that the select IMRN remains valid (e.g., it has not timed out) when the select IMRN is returned to the AS node for effectuating a SIP session with respect to the called party.

In a still further aspect, a method is disclosed that is operable with a UE device, comprising: providing call information associated with a SIP call to an AS node disposed in the IMS network, the call information including a call reference number, among others; verifying that the call reference number remains valid, the verifying being responsive to receiving a dynamically allocated IMRN from the AS node, wherein the dynamically allocated IMRN is selected from a pool of IMRNs and mapped to at least a portion of the call information; and responsive to verifying that the call reference number is valid, providing the dynamic IMRN to the AS node in order to facilitate a SIP session with respect to the called party using the call information.

In a still further aspect, a method is disclosed that is operable with an AS node, comprising: maintaining a pool of IMRNs wherein a select IMRN is mapped to call information received from a UE device with respect to a SIP call originated in a circuit-switched network domain; providing the select IMRN to the UE device; and upon verifying that the select IMRN remains valid when the select IMRN is returned to the AS node, establishing a SIP session with the called party based on the call information.

Figure 1:
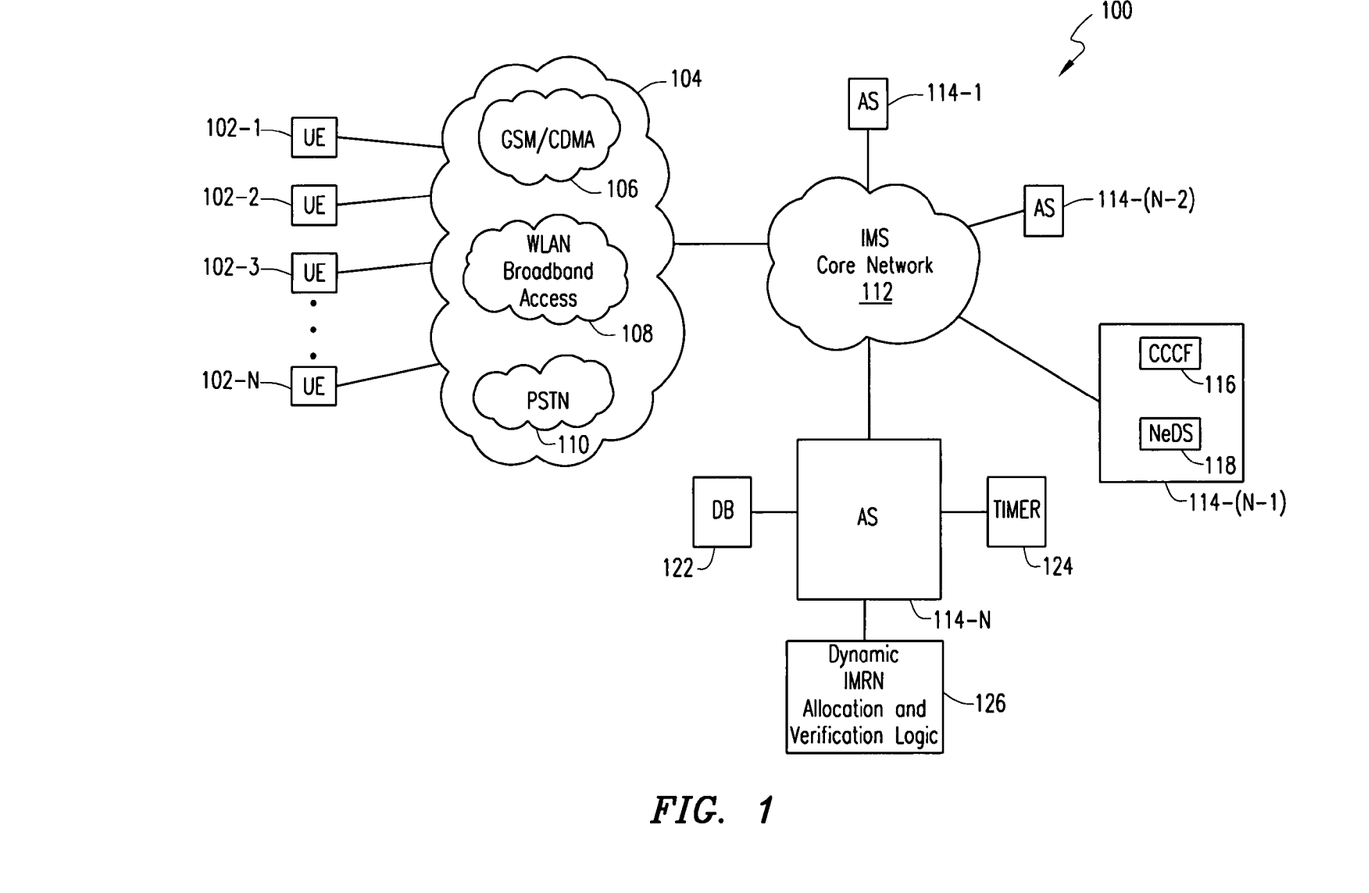
FIG. 1 depicts a network environment including circuit-switched network infrastructure and IP multimedia subsystem (IMS) infrastructure wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for routing a SIP call originated by a UE device in a circuit-switched network or domain. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and SIP-based signaling traffic. Broadly, IMS is a framework for managing the applications (i.e., services) and networks (i.e., access) that is capable of providing multimedia services. IMS defines an "application server" to be the network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various services, e.g., VCC, PTT, etc., as alluded to hereinabove. Furthermore, in order to effectuate call continuity and appropriate domain selection, one of the AS nodes, e.g., AS 114-(N–1), may be provided for implementing functionality referred to as call continuity control function (CCCF) 116 and network domain selection (NeDS) 118. In essence, the CCCF portion 116 of AS 114-(N–1) is operable as a new IMS application server element that resides in the home IMS network and tracks all call sessions and related mobile Voice-over-IP (VoIP) bearer traffic, including call handover/routing between CS and IMS domains. The NeDS portion 118 of AS 114-(N–1) is responsible for performing, inter alia, registration/de-registration management between the IMS and CS networks (e.g., GSM or CDMA). Although potentially separate functions, it is possible to integrate both the CCCF and NeDS functionalities into a single IMS-compatible network element AS 114-(N–1) as illustrated in FIG. 1. Additional details regarding the functionality of AS 114-(N–1) may be found in the pending U.S. patent application entitled "SYSTEM AND METHOD FOR MANAGING CALL ROUTING IN A NETWORK ENVIRONMENT INCLUDING IMS", application Ser. No. 11/328,875, filed Jan. 10, 2006, referenced hereinabove.

Additionally, another AS node, AS 114-N, is provided as part of the core IMS network 112 for facilitating routing of IP/SIP calls originated by one of the UE devices in the CS domain while connectivity in the PS domain is not available or the available PS networks are not capable of supporting the VoIP service (e.g. due to bandwidth limitations). Appropriate database structures (e.g., DB 122), timer mechanisms (e.g., timer 124) and suitable logic 126 may be provided in association with AS 114-N for purposes of configuring and managing a pool of IP multimedia routing numbers (IMRNs) from which a select IMRN may be dynamically allocated for purposes of SIP call routing as will be described in greater detail below.

In accordance with the teachings of the present patent disclosure, AS 114-N is preferably provided with appropriate logic/structure/software/firmware module(s) for performing the following: maintaining a pool of E.164 numbers that are operable as IMRNs which terminate on the AS node, wherein a select IMRN can be mapped to a called party's SIP URI received from a UE device; dynamically allocating the select IMRN to a received called party's SIP URI and providing the select IMRN to the originating UE device; verifying that the select IMRN has not timed out when that select IMRN is returned (via conventional CS call setup) to AS 114-N for effectuating a SIP call session with respect to the called party; and optionally, quarantining the select IMRN for a period of time upon releasing it back to the IMRN pool for future use.

To manage a pool of dynamically allocable IMRNs, the AS node (e.g., AS 114-N) may be configured in a number of ways with respect to the E.164 numbers. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at AS 114-N in order to ensure that the allocated IMRNs remain valid (e.g., they have not timed out, that is, they are used within appropriate time limits) or suitable quarantine times are applied. As will be described in detail below, management of timers associated with IMRNs at AS 114-N and timers associated with call reference numbers at the originating UE device allows for dynamic provisioning of IMRNs that could be used for effectuating SIP calls by the UE device operating in the CS domain.

Figure 2:
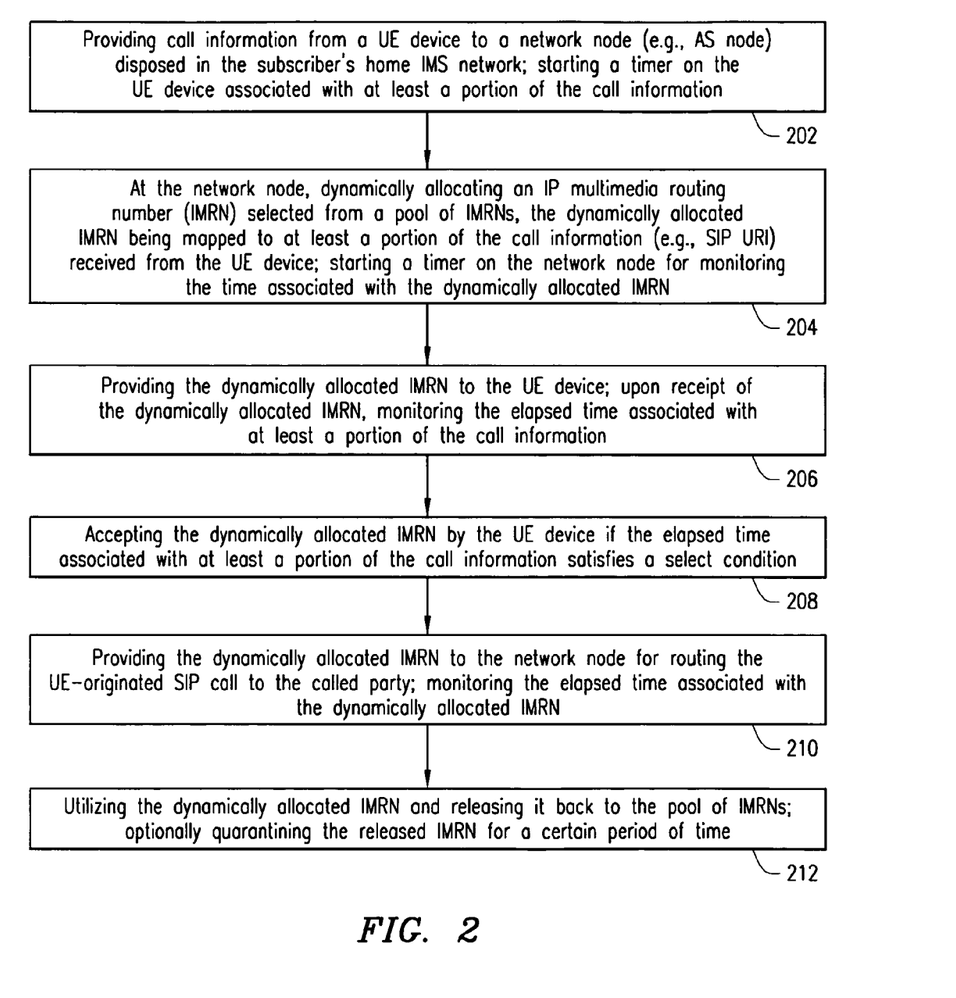
FIG. 2 depicts a flowchart of an exemplary embodiment of the present patent disclosure.

FIG. 2 depicts a flowchart of an exemplary embodiment of an overall methodology of the present patent disclosure for effectuating a CS-originated SIP call by a UE device with respect to a called party having a SIP URI. Preferably, the originating party either enters the URI via a suitable interface (e.g., MMI) or selects it from a list stored in the UE. As is well known, a typical SIP address may take on the form of sip: <username>@<hostname>, which may include additional syntax elements and parameters such as those described in, e.g., RFC 3261 entitled: *SIP: Session Initiation Protocol* and Internet Draft entitled *Obtaining and Using Globally Routable User Agent (UA) URIs (GRUU) in the Session Initiation Protocol (SIP)* (draft-ietf-sip-gruu-06) (Expires: Apr. 23, 2006). At block 202, various pieces of information relating to the SIP call (which may be collectively referred to as "call information" herein), such as a call reference number associated with the call, called party's SIP URI (or, the B-URI), Opaque parameter (if available), GRID parameter (if available), additional URI-related information (e.g., display name), calling party's SIP UIR (or, the A-URI), Opaque parameter, etc., are provided by the originating UE device to an IMS network node, e.g., AS 114-N. In other words, if the calling party sends a B-URI that comprises an Address of Record (AOR) as well as Opaque and GRID parameters, they will be provided as part of the call information. Additionally, if the calling party sends its own URI comprising AOR, Opaque and GRID parameters, they will also be provided in the call information.

Those skilled in the art should recognize that in the case of VCC, the IMS node operating to effectuate the SIP call functionality, i.e., AS 114-N, may also include the CCCF/NeDS functionality. Accordingly, in some embodiments, the AS/CCCF nodes may be treated as a single IMS network element. Regardless of the IMS AS/CCCF node implementation, a timer may be initiated on the UE device that is used for monitoring at least a portion of the call information that is transmitted by the originating UE device as described above. In particular, the timer may be implemented for monitoring the elapsed time since a particular call reference number is generated and forwarded to the IMS network node. At the IMS network node, an IMRN selected from the pool of IMRNs is dynamically associated with respect to the call reference number, wherein the IMRN is mapped to the at least a portion of the call information, e.g., the received called party's SIP URI (block 204). In some embodiments, the IMRN may be mapped to all the received SIP call information. Also, a timer may be started at the network node for monitoring a time-to-live variable associated with the dynamically allocated IMRN. Thereafter, the dynamically allocated IMRN is provided to the UE device using appropriate messaging as will be described below. Upon receipt of the dynamically allocated IMRN at the UE device, the elapsed time associated with the call reference number is monitored to ensure that it is not stale (block 206). The dynamically allocated IMRN is accepted by the UE device if the time elapsed satisfies a select condition, e.g., within a time-to-live value (block 208). Appropriate call setup is then initiated by the UE device using the dynamic IMRN, whereby the accepted IMRN is returned to the AS node since it terminates thereat. Upon receipt of the IMRN at the AS node, its time-to-live variable is monitored to ensure that it has not timed out (block 210). Thereafter, the called party's SIP URI and any other SIP information originally received that is mapped to the dynamically allocated IMRN is utilized by the AS node for effectuating the SIP session with the called party using a SIP Invite message, e.g., inserting the A-party URI, Opaque parameter etc. In one implementation, the dynamic IMRN may optionally be returned back to the pool of IMRNs wherein it may be quarantined for a certain period of time before it is reused or becomes available for future use (block 212).

Based on the foregoing, those skilled in the art will appreciate that when the call information, i.e., called party's SIP URI, call reference number, etc., is sent by the UE device to the serving AS node, appropriate logic at the AS node may create a record that maps the received call information to an E.164-based IMRN, which is transmitted back to the UE device. Upon correlating the IMRN with the call reference number, the UE sets up a call using the IMRN that terminates on the AS node. The IMRN is then interrogated against the record to retrieve the called party's URI for establishing a SIP session with the called party.

It should be further recognized by those skilled in the art that the message flow between the UE device and the home IMS network's AS node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS AS node operable to facilitate CS-originated SIP calls. Set forth below are a number of exemplary implementations of the message flow where a dynamically allocated IMRN is utilized for call routing with respect to a SIP call originated in the CS domain.

Figure 3:
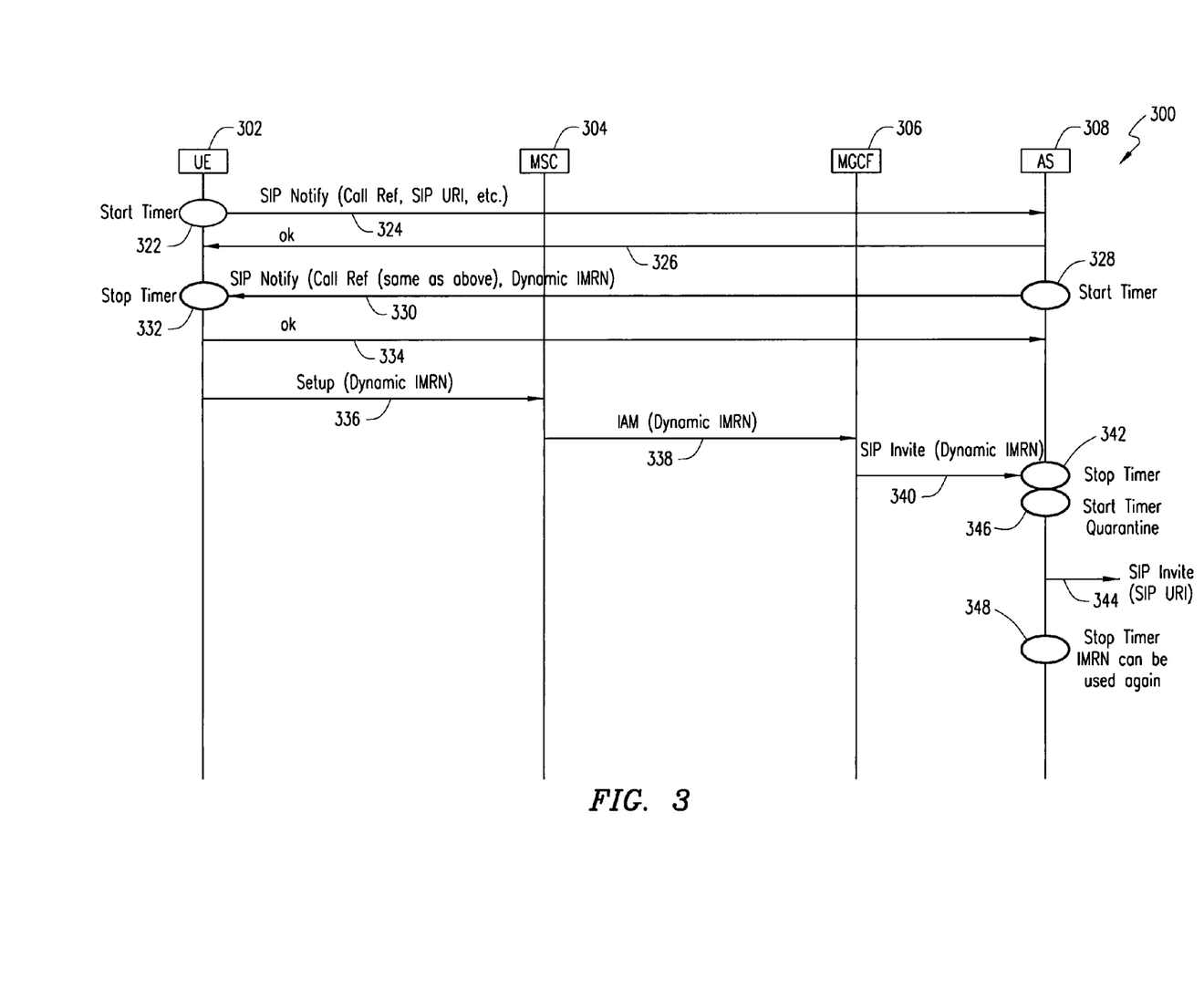
FIG. 3 depicts a message flow diagram for effectuating a SIP call by employing dynamically allocated IP multimedia routing numbers (IMRNs) in accordance with an embodiment.

FIG. 3 depicts a message flow embodiment 300 for effectuating a CS-originated SIP call based on dynamic IMRN allocation where SIP messaging is implemented. A wireless UE device 302 having the CS domain and IMS domain modes of functionality is operable to generate a SIP Notify message 324 towards AS 308 upon determining that a SIP call is being initiated in the CS domain. As alluded to before, the SIP Notify message includes applicable call information such as call reference number, called party's SIP URI, additional URI information, and the like, e.g., A-party AOR, Opaque parameter, GRID parameter, etc. A suitable timer mechanism 322 may be initiated at the UE device in order to monitor a time-to-live variable associated with the call reference number. Responsive to the SIP Notify message 324, AS node 308 generates an OK message 326 towards the UE device 302. Thereafter, preferably upon verifying that the user is allowed to do a SIP call, the AS node dynamically allocates a select IMRN to the received call information, e.g., SIP URI of the called party, and returns it back to UE 302 via a SIP Notify message 330. Again, suitable timer mechanism may be started (block 328) at the AS node 308 in order to monitor a time-to-live variable associated with the dynamically allocated IMRN. An OK message 334 is generated by the UE device towards the AS node 308 to acknowledge receipt of the SIP Notify message 330. After verifying that the call reference number has not timed out based on the UE device's timer mechanism (block 332), a call setup message 336 that includes dynamic IMRN is provided by the UE device 302 to MSC 304. In response, an Initial Address Message (IAM) message 338 with dynamic IMRN is generated by MSC 304 towards MGCF 306 for call routing. A SIP Invite message 340 is generated by MGCF 306 towards the AS node 308 which utilizes the dynamic IMRN—SIP call information mapping for routing the call to the called party (not shown) using a SIP Invite message 344. It should be recognized that one or more intermediate SIP messages and/or resource allocation and reservation negotiations may take place between MGCF 306 and the called party subsequent to SIP Invite 340, which are not described in particular detail herein. Also, additional ISUP messaging that may take place before a bearer path is established between the UE device 302 and the called party is not shown herein.

Upon receipt of the dynamically allocated IMRN via SIP Invite 340 at the AS node 308, the timer mechanism may be stopped (block 342) to verify if the IMRN has timed out. If so, the SIP Invite message may be discarded and the SIP call routing process may be terminated. If the IMRN has not timed out, the AS node 308 may set up a SIP session using the SIP Invite message 344, wherein the called party's SIP URI is determined based on interrogating the IMRN—URI mapping. Additionally, if no CallerID (CID) was received in the SIP Notify message 324, the AS node 308 may insert the CID with appropriate privacy options from the SIP Invite message 340, if received. After using the IMRN for establishing the SIP session by AS 308, it may be returned to the IMRN pool, wherein a quarantine timer may be started (block 346) such that the IMRN is prohibited from further use until the quarantine timer is stopped after a period of time (block 348).

As pointed out previously, the timer mechanism (e.g., blocks 322 and 332) at the device side may also be used to ensure that the call reference number has not timed out, which reference number is used by the UE device to correlate the information received from the AS node (e.g., dynamic IMRN). If the timer expires before the same reference number is received back from the AS node, the UE device may reattempt the call process a predetermined number of times (e.g., five attempts), after which if no response has been received, the call procedure may be deemed to have failed. In other words, if the UE device receives a reference number that is no longer valid, it may be discarded and the call procedure may be terminated.

Figure 4A:
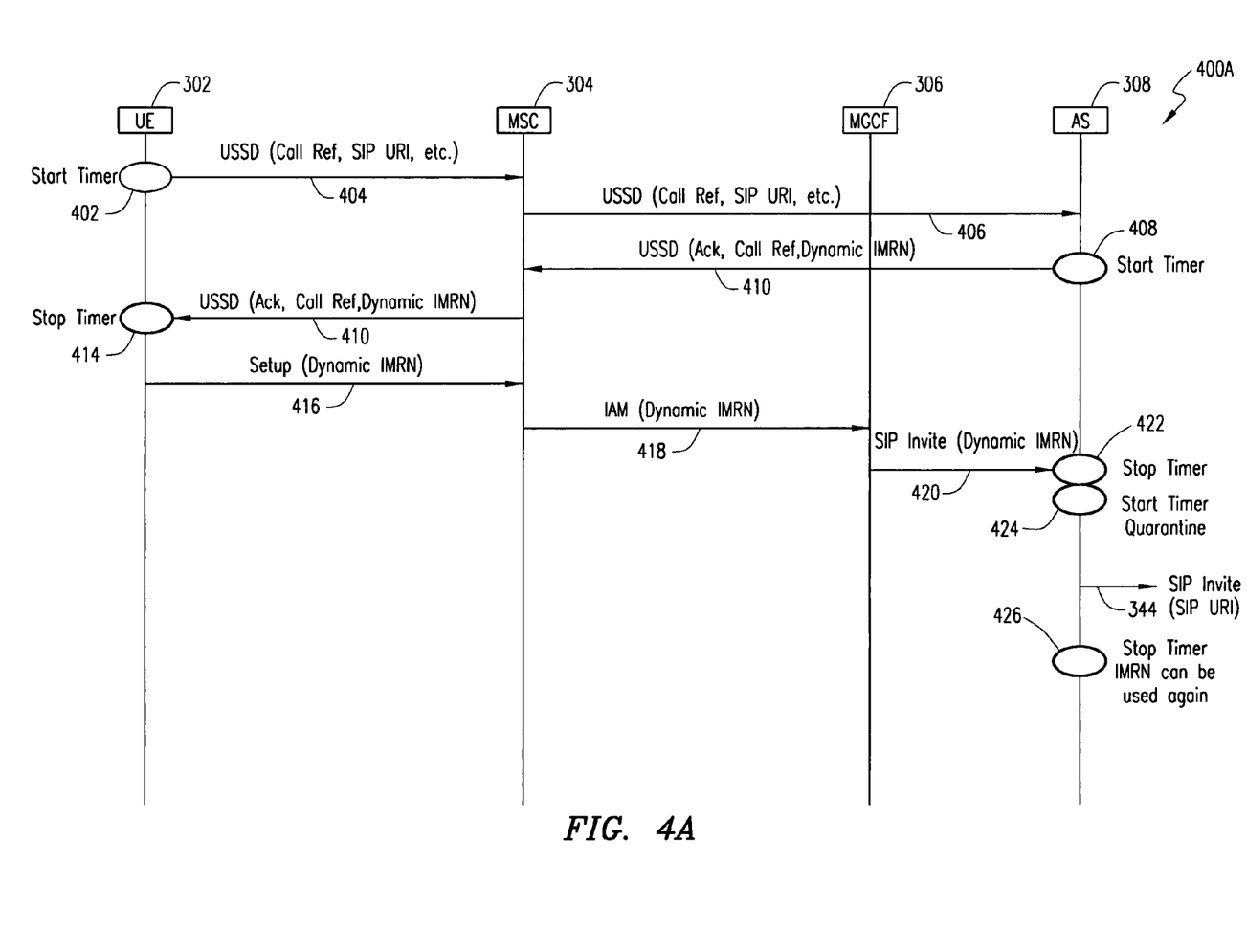
FIGS. 4A and 4B message flow diagrams for effectuating a SIP call by employing dynamically allocated IMRNs in accordance with a still further embodiment.

FIG. 4A depicts a message flow embodiment 400A for effectuating a CS-originated SIP call based on dynamic IMRN allocation where Unstructured Supplementary Service Data (USSD) messaging is implemented. Similar to the messaging procedure set forth above, the wireless UE device 302 is operable to generate a USSD message 404 to MSC 304, responsive to which another USSD message 406 may be forwarded to the AS node 308. As before, the USSD messages 404, 406 include applicable call information such as call reference number, called party's SIP URI, additional URI information, A-party SIP URI, etc. A suitable timer mechanism 402 may be initiated at the UE device in order to monitor a time-to-live variable associated with the call reference number. Responsive to the USSD message 406, the AS node 308 generates a USSD message 410 towards MSC 304 that includes both acknowledgement as well as dynamic IMRN and call reference number information. This USSD message 410 is forwarded to UE 302. Again, a suitable timer mechanism may be started (block 408) at the AS node 308 in order to monitor a time-to-live variable associated with the dynamically allocated IMRN. After verifying that the call reference has not timed out based on the UE device's timer mechanism (block 414), a call setup message 416 that includes dynamic IMRN is provided by the UE device 302 to MSC 304. In response, an IAM message 418 with dynamic IMRN is generated by MSC 304 towards MGCF 306 for effectuating SIP call routing. Similar to the messaging flow described previously, a SIP Invite message 420 is generated by MGCF 306 towards the AS node 308 for routing the call to the called party (not shown). Upon receipt of the dynamically allocated IMRN via SIP Invite 420 at the AS node 308, the timer mechanism may be stopped (block 422) to monitor if the IMRN has timed out. Thereafter, if the IMRN has not timed out, the AS node may set up a SIP session using the call information, e.g., B-party SIP URI, Opaque parameter, GRID parameters, A-party SIP URI, etc. received in the USSD message 406 against the IMRN to the correct destination via SIP Invite 344. Additionally, processes such as IMRN release and quarantining, etc. may be effectuated by the AS node 308 similar to the processes described above. Further, if no CallerID (CID) was received in the USSD message 406, the AS node 308 may insert the CID with appropriate privacy options from the SIP Invite message 420, if received. Appropriate timer mechanisms (blocks 424, 426) may accordingly be implemented at the AS node 308. Furthermore, the timer mechanism at the device side may also be used similarly with respect to the call reference number associated with the SIP call.

Figure 4B:
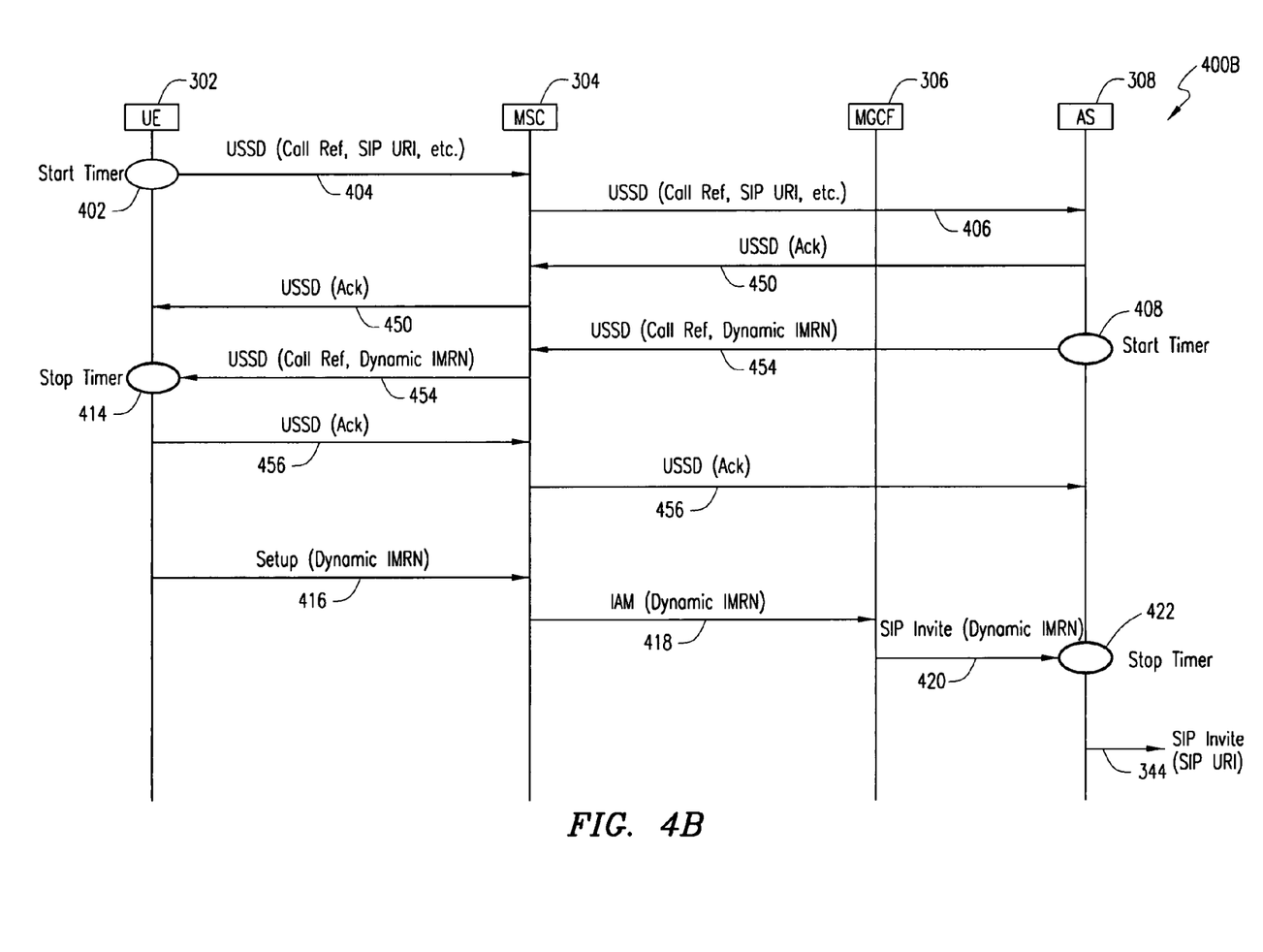

Another variation of USSD message flow embodiment 400B is shown in FIG. 4B. The message flow embodiment 400B is essentially identical to the embodiment 400A described above, except that separate USSD acknowledgement messages 450 and 456 are propagated between UE 302 and AS 308. Accordingly, additional USSD messaging 454 is provided for carrying the IMRN information from AS 308 to UE 302.

Figure 5:
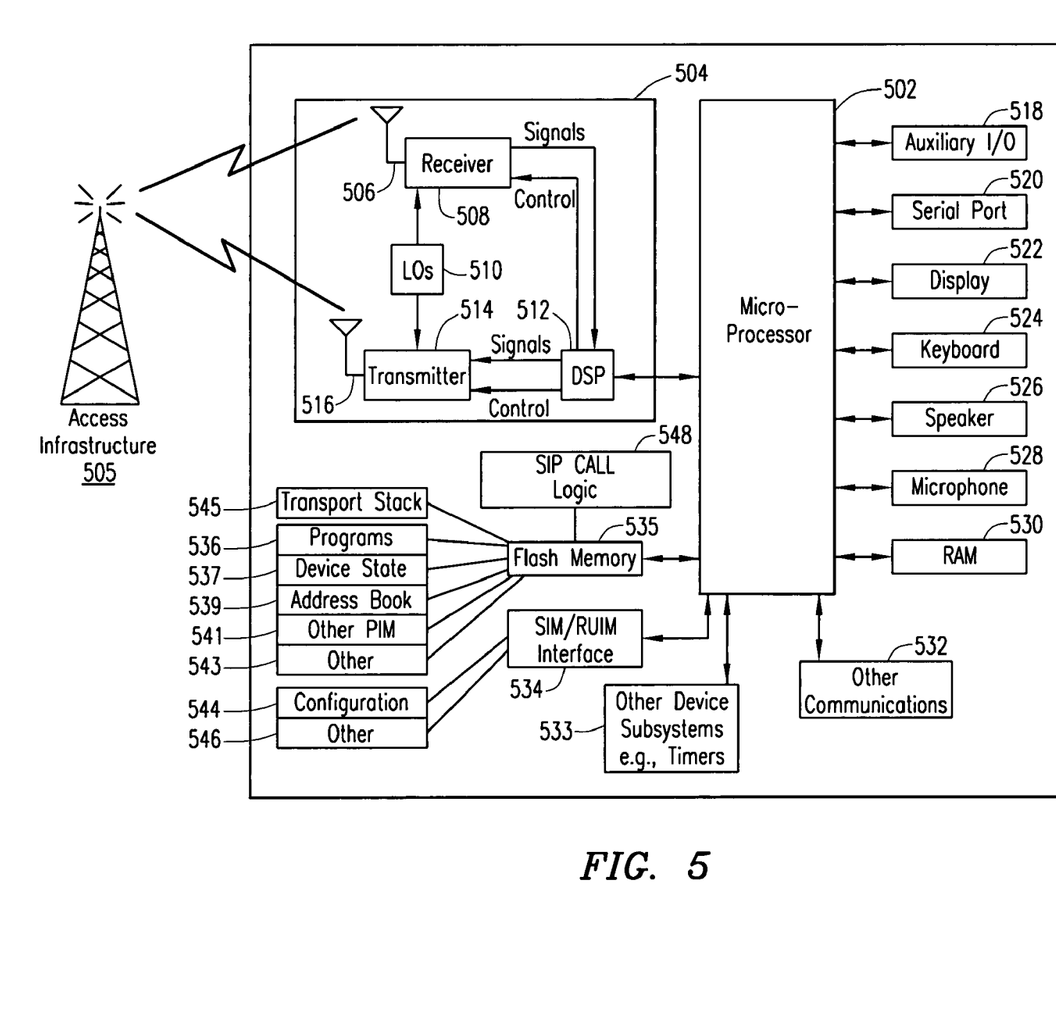
FIG. 5 depicts a block diagram of an embodiment of a communications device operable for purposes of the present patent disclosure.

FIG. 5 depicts a block diagram of an embodiment of a communications device operable as a wireless UE device, e.g., UE 302, for purposes of the present patent disclosure. It will be recognized by those skilled in the art upon reference hereto that although an embodiment of UE 302 may comprise an arrangement similar to one shown in FIG. 5, there can be a number of variations and modifications, in hardware, software or firmware, with respect to the various modules depicted. Accordingly, the arrangement of FIG. 5 should be taken as illustrative rather than limiting with respect to the embodiments of the present patent disclosure. A microprocessor 502 providing for the overall control of an embodiment of UE 302 is operably coupled to a communication subsystem 504 that is capable of multi-mode communications (e.g., CS domain, IP domain such as IMS, et cetera). The communication subsystem 504 generally includes one or more receivers 508 and one or more transmitters 514 as well as associated components such as one or more local oscillator (LO) modules 510 and a processing module such as a digital signal processor (DSP) 512. As will be apparent to those skilled in the field of communications, the particular design of the communication module 504 may be dependent upon the communications networks with which the mobile device is intended to operate (e.g., a CDMA network, a GSM network, WLAN, et cetera). Regardless of the particular design, however, signals received by antenna 506 through appropriate access infrastructure 505 (e.g., cellular base station towers, WLAN hot spots, etc.) are provided to receiver 508, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 512, and provided to transmitter 514 for digital-to-analog (D/A) conversion, frequency up conversion, filtering, amplification and transmission over the air-radio interface via antenna 516.

Microprocessor 502 may also interface with further device subsystems such as auxiliary input/output (I/O) 518, serial port 520, display 522, keyboard/keypad 524, speaker 526, microphone 528, random access memory (RAM) 530, a short-range communications subsystem 532, and any other device subsystems, e.g., timer mechanisms, generally labeled as reference numeral 533. To control access, a Subscriber Identity Module (SIM) or Removable User Identity Module (RUIM) interface 534 may also be provided in communication with the microprocessor 502. In one implementation, SIM/RUIM interface 534 is operable with a SIM/RUIM card having a number of key configurations 544 and other information 546 such as identification and subscriber-related data as well as SIP URI list information.

Operating system software and applicable service logic software may be embodied in a persistent storage module (i.e., non-volatile storage) such as Flash memory 535. In one implementation, Flash memory 535 may be segregated into different areas, e.g., storage area for computer programs 536 (e.g., service processing logic), as well as data storage regions such as device state 537, address book 539, other personal information manager (PIM) data 541, and other data storage areas generally labeled as reference numeral 543. A transport stack 545 may be provided to effectuate one or more appropriate radio-packet transport protocols. In addition, a SIP call logic module 548 is provided for effectuating call reference ID generation, validation, verification, and correlation with IMRNs, etc. as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A network node operable in an Internet Protocol (IP) multimedia subsystem (IMS) network, comprising:
    a component configured to maintain a mapping between an Internet Protocol multimedia routing number (IMRN) and a called party's Session Initiation Protocol (SIP) Uniform Resource Indicator (URI) received from a user equipment (UE) device with respect to a mobile-originated call directed to said called party; and
    a component configured to verify that said IMRN remains valid when said IMRN is received back by said network node for establishing a call using SIP-based information for said called party based on said mapping.

2. The network node as recited in claim 1, wherein said SIP URI is received via Unstructured Supplementary Service Data (USSD) signaling.

3. The network node as recited in claim 1, further comprising a component configured to quarantine said IMRN upon releasing it to a pool of IMRNs for future use.

4. The network node as recited in claim 1, wherein said IMRN comprises an E. 164 number.

5. The network node as recited in claim 1, wherein said IMRN is selected from a range of E.164 numbers.

6. The network node as recited in claim 1, further comprising a component configured to transmit said IMRN to said UE device.

7. The network node as recited in claim 1, wherein said IMRN is dynamically allocated.

8. A method for effectuating a call in a network environment including a circuit-switched (CS) network and an Internet Protocol (IP) multimedia subsystem (IMS) network, comprising:
    creating, at a network node, a mapping between an Internet Protocol multimedia routing number (IMRN) and a called party's Session Initiation Protocol (SIP) Uniform Resource Indicator (URI) received from a user equipment (UE) device with respect to a mobile-originated call directed to said called party;
    verifying that said IMRN remains valid when said selected IMRN is received back by said network node; and
    establishing said mobile-originated call using SIP-based information for said called party based on said mapping.

9. The method as recited in claim 8, wherein said SIP URI is received via Unstructured Supplementary Service Data (USSD) signaling.

10. The method as recited in claim 8, further comprising quarantining said IMRN upon releasing it to a pool of IMRNs for future use.

11. The method as recited in claim 8, wherein said IMRN comprises an E.164 number.

12. The method as recited in claim 8, wherein said IMRN is selected from a range of E.164 numbers.

13. The method as recited in claim 8, further comprising: transmitting said IMRN to said UE device.

14. The method as recited in claim 8, wherein said IMRN is dynamically allocated.

15. A user equipment (UE) device operable to originate a call in a network environment (100) including a circuit-switched (CS) network and an Internet Protocol (IP) multimedia subsystem (IMS) network, comprising:
    a processor configured to control at least one of a plurality of sub-systems to transmit call information associated with a mobile-originated call to a network node disposed in said IMS network, said call information including at least one of a call reference number and a called party's SIP Uniform Resource Indicator (URI);

the processor further configured to control at least one of the plurality of sub-systems to process an IP multimedia routing number (IMRN) received from said network node;

the processor further configured to control at least one of the plurality of sub-systems to verify that said call reference number received back from said network node remains valid; and the processor further configured to control at least one of the plurality of sub-systems to transmit said IMRN to said network node for facilitating said mobile-originated call using SIP-based information with respect to said called party.

16. The UE device operable originate a SIP call in a network environment as recited in claim 15, wherein said call information is transmitted to said network node using Session Initiation Protocol (SIP).

17. The UE device operable originate a SIP call in a network environment as recited in claim 15, wherein said call information is transmitted to said network node using Unstructured Supplementary Service Data (USSD) signaling.

18. A method for originating a call in a network environment including a circuit-switched (CS) network and an Internet Protocol (IP) multimedia subsystem (IMS) network, said method comprising:

transmitting, from a user equipment device, call information associated with a mobile-originated call to a network node disposed in said IMS network, said call information including at least one of a call reference number and a called party's SIP URI;

receiving an IP multimedia routing number (IMRN) and said call reference number from said network node;

verifying that said call reference number received back from said network node remains valid; and transmitting said IMRN to said network node for facilitating said mobile-originated call using SIP-based information with respect to said called party.

19. The method as recited in claim 18, wherein said call information is transmitted to said network node via a Session Initiation Protocol (SIP) message.

20. The method as recited in claim 18, wherein said call information is transmitted to network node via an Unstructured Supplementary Service Data (USSD) message.

* * * * *